UNITED STATES PATENT OFFICE.

RICHARD SOUTHERTON, OF BIRMINGHAM, ENGLAND, ASSIGNOR TO GEORGE E. KEEY AND RICHARD SOUTHERTON, JR., OF SAME PLACE.

PROCESS OF TREATING IRON.

SPECIFICATION forming part of Letters Patent No. 470,606, dated March 8, 1892.

Application filed September 3, 1891. Serial No. 404,612. (No specimens.) Patented in England July 16, 1888, No. 10,266; in France March 16, 1889, No. 196,748; in Belgium March 30, 1889, No. 85,407; in Germany May 14, 1890, No. 52,221; in Italy June 30, 1890, No. 27,282, and in Austria-Hungary September 15, 1890, No. 13,236 and No. 28,989.

*To all whom it may concern:*

Be it known that I, RICHARD SOUTHERTON, a subject of the Queen of Great Britain, residing at Birmingham, in the county of Warwick, England, have invented certain new and useful Improvements in Processes of Treating Iron; and I do hereby declare the following to be a full, clear, and exact description of the invention, such as will enable others skilled in the art to which it appertains to make and use the same.

This invention has been patented in the following countries: in England, No. 10,266, dated July 16, 1888; in France, No. 196,748, dated March 16, 1889; in Belgium, No. 85,407, dated March 30, 1889; in Germany, No. 52,221, dated May 14, 1890; in Italy, No. 27,282, dated June 30, 1890, and in Austria-Hungary, Nos. 13,236 and 28,989, dated September 15, 1890.

This invention relates to the manufacture of iron; and it consists in treating the iron during the reducing process, as hereinafter fully described and claimed, and of the combined physic and flux used for that purpose.

In carrying out the invention ten parts of emery are mixed with eight parts of ammonia-alum. Corundum, bauxite, or other equivalent aluminous material may be used in place of the emery. The emery is coarsely powdered or is used in the crude state, and the materials are preferably heated or calcined, either before or after mixing, to drive off moisture; but they may be used without such heating or drying. These materials are then mixed with slaked lime and are pressed into briquettes or balls and allowed to harden.

From two to ten parts of the mixture in the form of briquettes or balls are used to each one hundred parts of iron, according to the hardness required in the iron, and four parts of mixture to one hundred parts of iron will be found to give excellent results. The iron used is in the form of cast-iron or iron ore, hematite being preferred, and the mixture is added to the same with the ordinary amount of fuel, such as coke or coal, and the iron is subjected to the heat of any approved furnace—such as a blast, cupola, or reverberatory furnace—in which the iron can be reduced. The pure alumina of the mixture exerts a peculiar action upon the iron with which it becomes incorporated under the influence of intense heat. The tensile strength of the iron is greatly increased and it is rendered more ductile.

The action of the alumina upon the iron appears to be somewhat analogous to the action of carbon upon iron in the manufacture of steel, and it is also believed to clean the iron from impurities and leave it in a very pure condition.

The lime acts as a flux in the ordinary manner, and, being formed into briquettes or balls with the physic, the mixture is not blown away by the blast of air in the furnace.

What I claim is—

1. The method of treating iron, which consists in mixing briquettes or balls of emery, ammonia-alum, and lime with the ore, substantially as and in the proportions hereinbefore set forth, and then reducing the iron to its metallic state in a furnace.

2. A combined physic and flux for iron, consisting of pressed briquettes or balls of emery, ammonia-alum, and lime mixed together substantially as and in the proportions hereinbefore set forth.

In testimony whereof I affix my signature in presence of two witnesses.

RICHARD SOUTHERTON.

Witnesses:
WILLIAM HENRY HALL,
ARNOLD GROVES GREENWAY.